United States Patent [19]

Christian

[11] 4,226,568

[45] Oct. 7, 1980

[54] PALLET POSITIONER

[75] Inventor: Alfred W. Christian, Woodstock, Canada

[73] Assignee: Hydrotile Canada Limited, Woodstock, Canada

[21] Appl. No.: 920,816

[22] Filed: Jun. 30, 1978

Related U.S. Application Data

[62] Division of Ser. No. 753,526, Dec. 12, 1976, Pat. No. 4,118,165.

[51] Int. Cl.[3] ............ B23B 21/00

[52] U.S. Cl. ............ 414/589; 425/253; 425/452

[58] Field of Search ............ 414/101, 102, 589; 187/9 R, 17, 95; 425/253, 452, 453; 254/2 R

[56] References Cited

U.S. PATENT DOCUMENTS

| | | | |
|---|---|---|---|
| 2,781,866 | 2/1957 | Milam | 187/17 |
| 2,926,411 | 3/1960 | Steiro | 425/421 X |
| 3,083,433 | 4/1963 | Tiller | 425/432 X |
| 3,383,742 | 5/1968 | Nelson | 425/452 |
| 3,396,441 | 8/1968 | Robinson | 425/426 X |
| 3,518,732 | 7/1970 | Foster | 425/429 X |
| 3,584,356 | 6/1971 | Joelson | 425/452 X |
| 4,095,677 | 6/1978 | Johannson | 187/95 X |

FOREIGN PATENT DOCUMENTS 869614 4/1971 Canada .

*Primary Examiner*—L. J. Paperner

*Attorney, Agent, or Firm*—Burd, Bartz & Gutenkauf

[57] ABSTRACT

A pallet positioner is used to locate a pair of pallets in selected positions on the turntable of a concrete pipe making machine. The pallet positioner has a frame supported for vertical movement on upright supports below the turntable. A hydraulic cylinder connected to the frame operates to move the frame up and down. A pallet guide and positioning structure connected to the frame is moved up through holes in the turntable to support pallets above the turntable. The form assembly having two jackets is placed over the raised pallets and locked into the bell sections of the jackets. The form assembly has lock structures which hold the pallets in the bell section of the jackets. The frame and pallet guide and positioning structure is then lowered away from the turntable. The form assembly is moved by the turntable to locate the jackets in vertical alignment with two packerheads. A gear box mounted on a cross head is connected to downwardly directed packerhead shafts operable to rotate the packerheads. The cross head is movably mounted on an upright frame and is lowered to the bottom area of the jackets adjacent the pallets before concrete is discharged into the jackets by separately controlled conveyors. A dual bell packer is moved into engagement with the pallets to rotate and vibrate the pallets to form the bell sections of the concrete pipes. The packerheads are simultaneously rotated and elevated in the jackets, as concrete is discharged into the jackets, to simultaneously build up the cylindrical walls of the pair of concrete pipes.

17 Claims, 14 Drawing Figures

FIG. 5
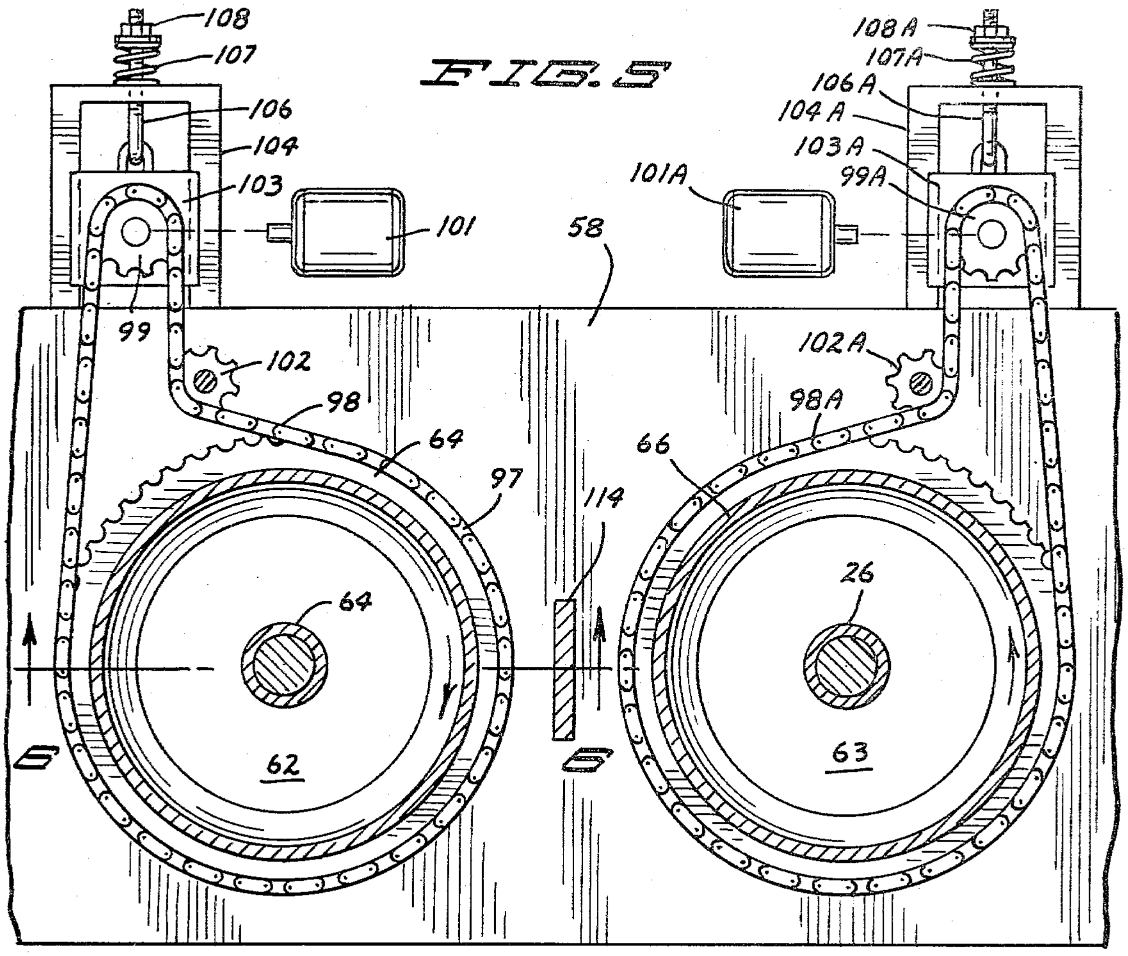
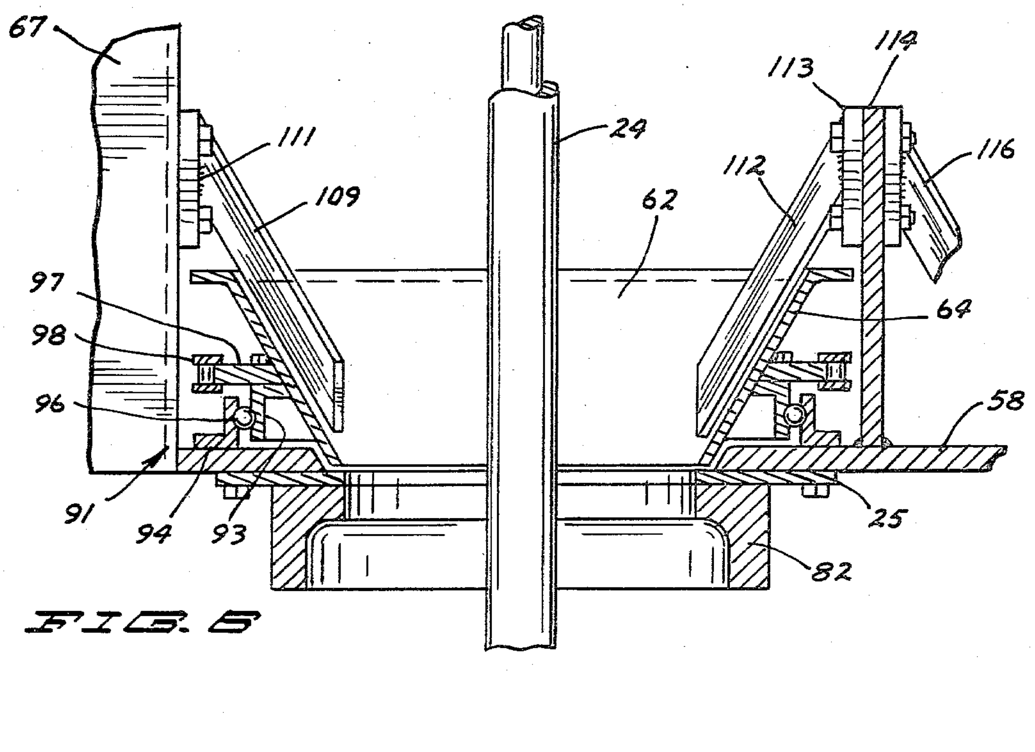
FIG. 6

PALLET POSITIONER

This application is a Division of U.S. application Ser. No. 753,526, filed Dec. 12, 1976, now U.S. Pat. No. 4,118,165.

BACKGROUND OF INVENTION

Conventional packer head machines for making a concrete pipe utilize a rotating packer head and a cylindrical outer jacket to form the concrete pipe. A pallet is located on a turntable adjacent the lower end of the jacket. A top table adjacent the upper end of the jacket has a hole for allowing the packer head to be located in the bottom end of the jacket. Concrete from a hopper and conveyor system is discharged through the hole into the jacket above the packer head. The pipe is formed by simultaneous rotation and elevation of the packer head. Gourlie et al shows in U.S. Pat. No. 3,262,175 a packer head concrete pipe making machine.

The top table can be equipped with a feeding device. The feeding device has a plurality of blades that are rotatable to move the concrete from the top table into the jacket. An example of a feeding device is shown by Fosse et al in U.S. Pat. No. 3,551,968. Another feeding device is shown by Miller in U.S. Pat. No. 1,137,776.

It has been found that to make a satisfactory bell end on a concrete pipe, a bell packer should be used. A bell packer is a mechanism that rotates and vibrates the pallet during the initial stages of making the pipe. A bell packer structure is shown by Tiller in U.S. Pat. No. 3,083,433.

Conduit forming machines having a plurality of packer heads are used to form a plurality of openings in a single pipe. The pipe is formed in a single outer jacket. The plurality of packer heads and cylindrical followers are used to make a plurality of passages through the pipe. Norton et al in U.S. Pat. No. 3,095,628 shows this type of machine.

A machine for making a plurality of concrete pipes is disclosed by Steiro in U.S. Pat. No. 2,926,411. This machine has four jackets that are positioned about four upright cores. The concrete is placed in the annular spaces between the cores and the jackets to form the pipes. The machine does not use packer heads for making the pipes.

SUMMARY OF INVENTION

The invention is directed to an apparatus for simultaneously making a plurality of concrete tubular bodies. More particularly, the apparatus is a machine for simultaneously making two or more concrete pipes. The machine has a frame extended upwardly from a turntable. A form assembly having first and second upright outer jackets is mounted on the turntable and positionable in vertical alignment with a pair of packer heads. The packer heads are connected to a gear box mounted on a cross head with a pair of downwardly directed rotatable drive shafts. The cross head movably mounted on the frame controls the vertical position of the packer heads. A top table having rotatable filler funnels and stationary wiper blades is used to direct the concrete into the jackets above the packer heads. Header rings are used to form the male end of the pipes. A bell packer having two vibrating and turning units is used to simultaneously rotate and vibrate the pallets for the pipes to form the bell sections of the pipes.

An object of the invention is to provide a machine that can simultaneously make a plurality of concrete pipes in a single station. Another object of the invention is to provide an apparatus for concurrently making two concrete pipes in a manner which utilizes a minimum amount of labor, time, and energy. A further object of the invention is to provide a pallet positioner that locates two or more pallets in positions on a turntable to accommodate the outer jackets used to make concrete pipes. These and other objects of the invention are shown and described in this specification.

IN THE DRAWING

FIG. 5 is an enlarged sectional view taken along line 5—5 of FIG. 3;

FIG. 6 is an enlarged sectional view taken along line 6—6 of FIG. 5;

DESCRIPTION OF PREFERRED EMBODIMENT

Figure 1:
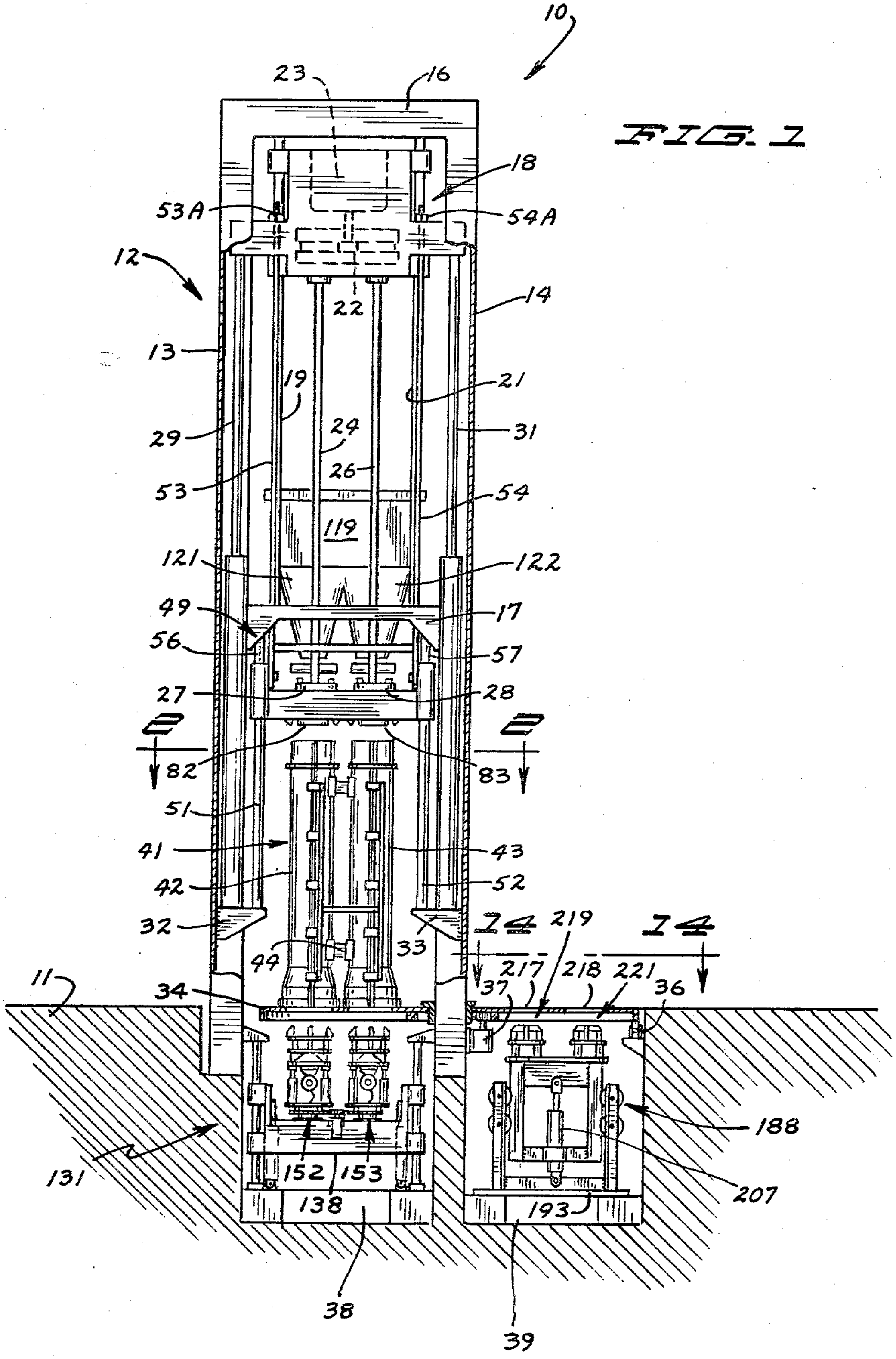
FIG. 1 is a front elevational view of a two packer head machine for simultaneously making two concrete pipes.

Referring to FIG. 1, there is shown an apparatus indicated generally at 10 for simultaneously making two concrete pipes. Apparatus 10 has an upright frame 12 including a first and second upright front posts 13 and 14. Posts 13 and 14 are structural frame members, as I beams, channel beams, or the like. The upper ends of posts 13 and 14 are connected to a cross top member 16. Intermediate portions of posts 13 and 14 are connected to an intermediate cross member 17. The lower ends of posts 13 and 14 are secured to a foundation 11, as a concrete floor or like support. Frame 12 has additional upright posts and rearwardly directed members (not shown) providing the frame with a generally rectangular skeleton.

A movable carriage or cross head 18 extends transversely between the posts 13 and 14. Cross head 18 is slidably mounted on a pair of upright guides 19 and 21. Guides 19 and 21 are cylindrical upright rods having upper ends secured to top cross member 16 and lower ends secured to intermediate cross member 17. Cross head 18 has a gear box 22 that is drivably connected to an electric motor 23. A pair of downwardly directed packer head shaft assemblies 24 and 26 are drivably connected to gear box 22 and move vertically with cross head 18. Shaft assemblies 24 and 26 have drive shafts enclosed in tubular housings which protect and reinforce the shafts. Rotatable packer heads 27 and 28 are connected to the lower ends of shaft assemblies 24 and 26, respectively. Packer heads 27 and 28 can be of known construction, such as the packer head disclosed in U.S. Pat. No. 3,262,175. Each packer head 27 and 28 has a cylindrical body carrying a plurality of rollers. Upright blades on top of the body operate to move concrete from the top of the body to the annular space between the body and the jacket or outer form. Cage positioners can be used with the packer heads 27 and 28, such as the cage positioner shown in U.S. Pat. No. 3,262,175.

A pair of long hydraulic cylinders 29 and 31 are used to selectively raise and lower cross head 18. Cylinder 29 positioned adjacent the inside of post 13 is attached to a support or foot 32 secured to post 13. The upper end of cylinder 29 is connected to a portion of cross head 18. Cylinder 31 is attached to a support or foot 33 secured to post 14. Cylinder 31 extends upwardly from foot 33 adjacent post 14 to cross head 18. Suitable lines and valves (not shown) connect cylinders 29 and 31 to the controls for operation of apparatus 10.

A circular turntable 34 surrounds the lower end of post 14. Suitable rollers or wheels 36 movably support turntable 34 on curved tracks or other support surfaces. A drive unit 37 connected to the center portion of turntable 34 functions to sequentially rotate table 34 around post 14 to change the pipe making stations of the machine. Table 34 covers a pair of pits or chambers 38 and 39. Table 34 has a plurality of pairs of radially aligned holes 217 and 218 for providing passages for pallet positioners and a bell packet hereinafter described.

Figure 2:
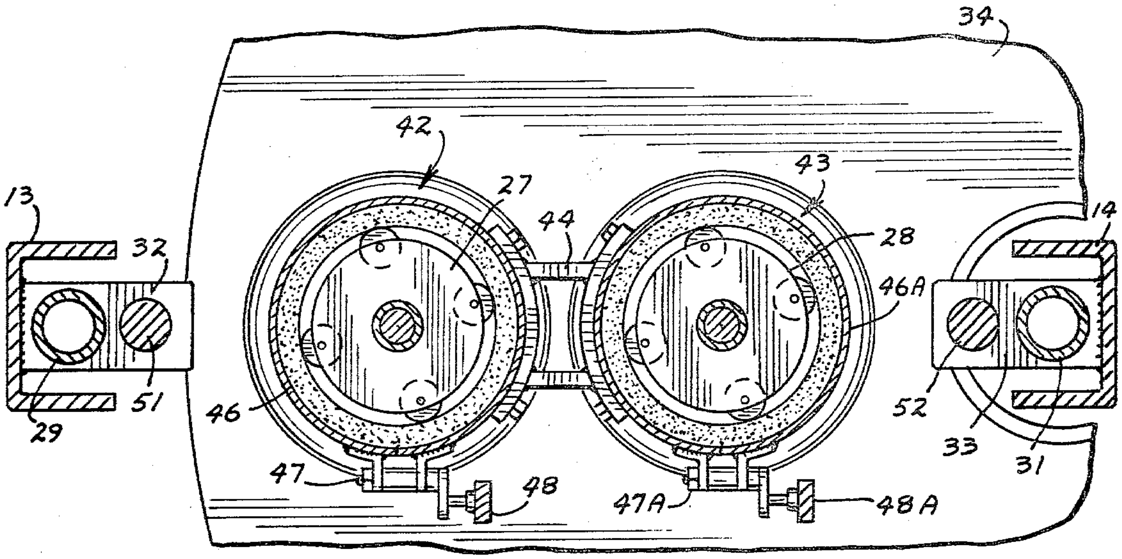
FIG. 2 is an enlarged sectional view taken along line 2—2 of FIG. 1 with the packer heads in the down positions.

A two pipe form assembly indicated generally at 41 is supported on table 34 between posts 13 and 14. Form assembly 41 comprises first and second upright outer forms or cylindrical jackets 42 and 43 surrounding cylindrical chambers of accommodating packer heads 27 and 28. As shown in FIG. 2, forms 42 and 43 are connected together with a plurality of connector or bracket structures 44. Form 42 has a cylindrical outside wall 46 having an upright longitudinal split which allows the wall to expand so that the form can be stripped from a pipe. A plurality of releasable latches 47 are operable to hold the cylindrical wall 46 in its closed position as shown in FIG. 2. An upright control member 48 connected to all latches 47 is movable to concurrently lock or unlock the latches 47. Form 44 has a similar cylindrical wall and latches identified with the same reference numbers with suffix A. A detailed disclosure of the two pipe form assembly 41 is found in U.S. Pat. No. 4,134,568.

The two pipe form assembly disclosed in U.S. Pat. No. 4,134,568 is incorporated herein by reference.

Figure 3:
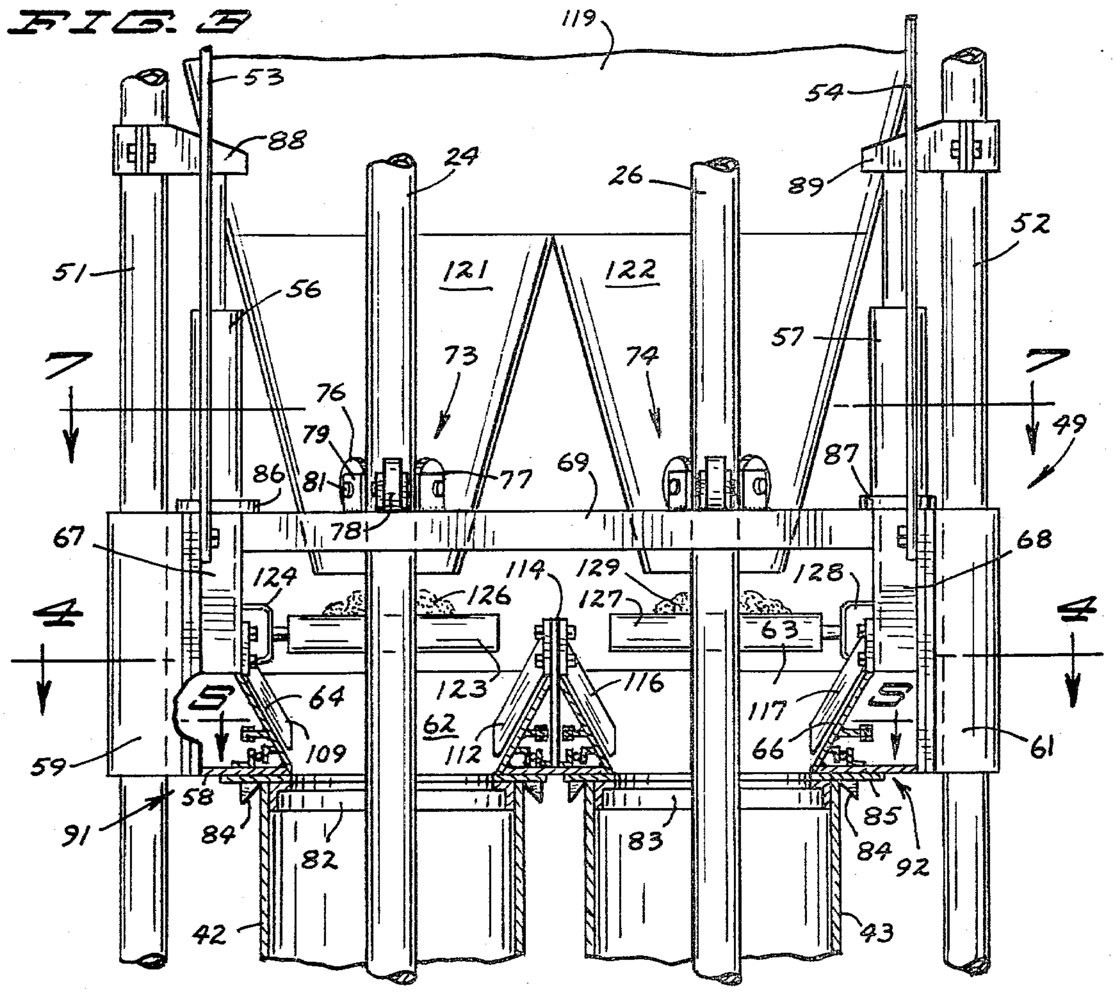
FIG. 3 is a front elevational view, partly sectioned, of the midsection of the machine of FIG. 1 with the packer heads in the down positions.

As shown in FIGS. 1 and 3, a movable top table indicated generally at 49 is located above form assembly 41 between posts 13 and 14. Table 49 is slidably mounted on a pair of upright rods or guides 51 and 52. The upper ends of guides 51 and 52 are secured to intermediate cross member 17. The lower ends of guides 51 and 52 are attached to inwardly directed support brackets 32 and 33 secured to posts 13 and 14 respectively. Two pair of lift rods 53 and 54 secured to opposite sides of top table 49 extend upwardly to cross head 18. Stop nuts 53A and 54A thread on rods 53 and 54 engage cross head 18 to lift top table 49 from form assembly 41 when cross head 18 is at its raised or up position. When cross head 18 is lowered, top table 49 is lowered into engagement with the top of form assembly 41. A pair of hold down hydraulic cylinders 56 and 57 interposed between table 49 and stop brackets 88 and 89 mounted on guides 51 and 52 hold top table 49 in engagement with the top of form assembly 41. Blocks 86 and 87 mount cylinders 56 and 57 on opposite ends of beam 69. As shown in FIG. 1, top table 49 is in the raised position spaced above the upper ends of the jackets 42 and 43. Turntable 34 can be turned to move form assembly 41 from under table 49 where it is accessible to lift and transport vehicles used to move form assembly 41 and pipes to a pipe curing and form stripping location. FIG. 3 shows table 49 in its lowered position in engagement with the upper ends of first and second jackets 42 and 43. Brackets 88 and 89 can be mounted on guides 51 and 52 at selected elevations so that form assemblies having different heights can be used with pipe making apparatus 10.

Figure 4:
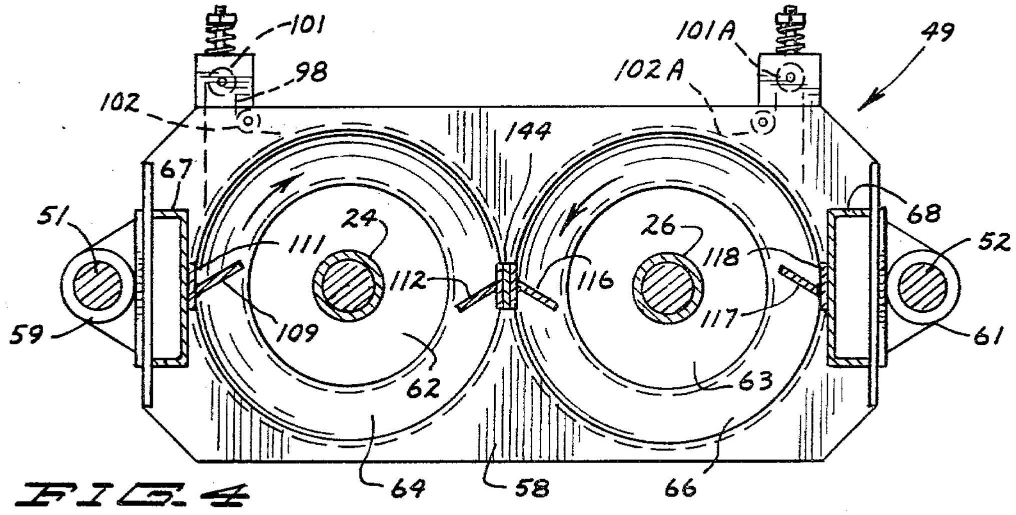
FIG. 4 is a sectional view taken along line 4—4 of FIG. 3.
Figure 7:
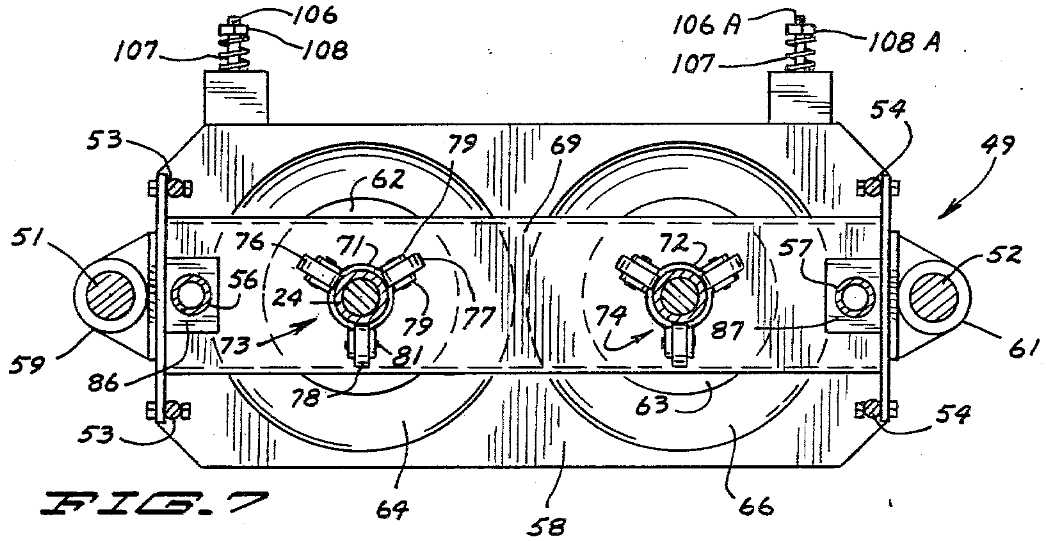
FIG. 7 is a sectional view taken along line 7—7 of FIG. 3.
Figure 10:
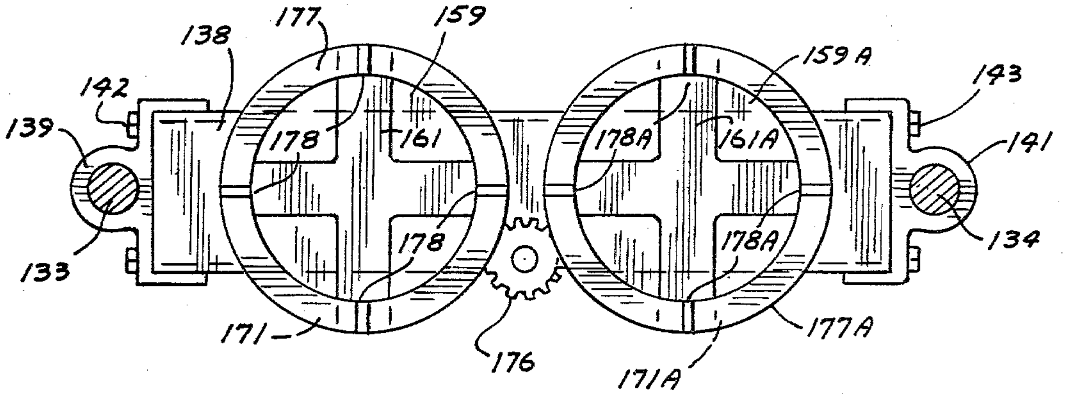
FIG. 10 is a sectional view taken along line 10—10 of FIG. 8.

Top table 49 has a horizontal base or platform 58 located between guides 51 and 52. A pair of upright tubular members or sleeves 59 and 61 attached to opposite ends of platform 58 slidably surround guides 51 and 52. As shown in FIGS. 4 and 5, platform 58 has two openings or holes 62 and 63 concentric with packer head shaft assemblies 24 and 26. Openings 62 and 63 are aligned with the open upper ends of jackets 42 and 43 to permit concrete to be conveyed into the chambers surrounded by jackets 42 and 43. Platform 58 has a first funnel 64 formed by an annular cone-shaped or inclined wall surrounding opening 62 providing structure for directing concrete toward opening 62. A second funnel 66 formed by an annular downwardly inclined or cone-shaped wall surrounds opening 63. Upwardly directed channel members 67 and 68 are secured to opposite ends of platform 58 adjacent the inside of sleeves 59 and 61, respectively. A cross beam 69 is attached to the upper ends of members 67 and 68. Cross beam 69 has a pair of holes 71 and 72 for accommodating the packer head shaft assemblies 24 and 26.

A first guide assembly 73 is mounted on the top of cross beam 69 for stabilizing and guiding packer head shaft assembly 24. A second guide assembly 74 mounted on cross beam 69 stabilizes packer head shaft assembly 26. Guide assembly 73 has three wheels 76, 77 and 78 circumferentially spaced around the tube of drive shaft 24 and engageable therewith. Each wheel is located between pairs of ears or blocks 79 secured to cross beam 69. A transverse pivot pin 81 rotatably mounts the wheels on blocks 79. The second guide assembly 74 has the same wheel structure as first guide assembly 73. Guide assemblies 73 and 74 minimize vibration and whipping of shaft assemblies 24 and 26. Mounting the guide assemblies on table 49 insures that the midportions of shaft assemblies 24 and 26 are stabilized at an advantageous position on the apparatus.

A pair of cylindrical headers or tongue formers 82 and 83 are secured to the bottom of platform 58. Header 82, as shown in FIG. 3, fits into the upper end of jacket 42. Header 83 fits into the upper end of jacket 44. A plurality of circumferentially spaced tabs 84 secured to the bottom of a plate 85 guide the upper ends of jackets 42 and 43 into concentric relationship with cylindrical headers 82 and 83. Headers 82 and 83 form the stepped or male portion of the pipes which fits into the bell end of adjacent pipes. Headers 82 and 83 can be mounted in the upper ends of jackets 42 and 43 independent of platform 58.

First and second rotatable support means indicated generally at 91 and 92 rotatably support funnels 64 and 66 respectively on platform 58. Funnels 64 and 66 are rotatable about upright axes concentric with packer head shaft assemblies 24 and 26. Referring to FIG. 6, rotatable support means 91 has a rotatable annular ring 93 secured to the annular portion of funnel 64. A stationary second ring 94 surrounds ring 93 and is secured to platform 58. A plurality of roller members, as balls 96, interposed between the rings 93 and 94 rotatably mount ring 93 and funnel 64 on ring 94. An annular sprocket 97 is attached to ring 93 and funnel 64. An endless roller chain 98 is trained about sprocket 97. Rotating support means 92 for funnel 66 has the same ring and bearing structure as shown in FIG. 6.

Referring to FIG. 5, chain 98 extends around a drive sprocket 99 connected to a power unit 101, as a hydraulic or electric motor. An idler sprocket 102 rotatably mounted on platform 58 guides chain 98 for movement toward the sprocket 97. Drive sprocket 99 is rotatably mounted on a movable plate 103. Opposite edges of plate 103 are located in generally U-shaped guides 104. A bolt 106 is secured to plate 103 and carries a spring 107 and nut 108. Spring 107 biases the bolt 106 in an outward direction and thereby maintains a resilient tension or biasing force on chain 98. The drive arrangement for chain 98A is identical with the drive for chain 98. The corresponding parts of the drive structure for chain 98A are the same reference numerals with the suffix A as the parts of the drive structure for the chain 98.

As shown in FIGS. 3, 4, and 6, a plurality of stationary wiper means extend downwardly adjacent the inside surfaces of funnels 64 and 66 to direct concrete that may be located on the funnels into the central openings 62 and 63. Wiper means include a first wiper 109 attached to a mounting plate 111. Plate 111 is secured to the upright channel member 67. Blade 109 is a generally flat member that extends downwardly and inwardly into the space surrounded by the inside wall of funnel 64. Located opposite blade 109 is a second downwardly and inwardly inclined blade 112. The upper end of blade 112 is secured to a mounting plate 113. Mounting plate 113 is attached to an upright post or support 114. The lower end of support 114 is secured to platform 58. Post 114 also mounts a second wiper blade 116. Blade 116 extends downwardly and inwardly in funnel 66. A second blade 117 is located opposite blade 116. The upper end of blade 117 is secured to channel member 68 with a mount 118. As shown in FIG. 4, blades 109, 112, 116, and 117 are angularly extended in the direction of the rotation of funnels 64 and 66 whereby they achieve wiping of the funnels to direct the concrete from the funnels into the openings 62 and 63, respectively.

Referring to FIG. 3, a hopper 119 has two downwardly directed discharge funnels 121 and 122 for directing concrete 126 and 129 onto two horizontal conveyors 123 and 127. Hopper 119 can be mounted on frame 12 with support structure, as vertical guides, which permits vertical relocation of the hopper 119 and conveyors 123 and 127. The discharge ends of conveyors 123 and 127 are located in close proximity to the tops of funnels 64 and 66. A controlled drive unit 124, as a hydraulic motor, operates to move conveyor 123 to discharge the concrete to opening 62 adjacent shaft assembly 24. The concrete 126 falls through opening 62 into the chamber surrounded by jacket 42. In a similar manner, a controlled drive unit 128, as a second hydraulic motor, drives conveyor 127 to carry the concrete 129 to opening 63 leading to the chamber surrounded by jacket 43.

Returning to FIG. 1, a bell packer indicated generally at 131 is located in pit 38 below turntable 34. Bell packer 131 is movable to an up position and operable to concurrently vibrate and rotate the pallets located above turntable 34 in the bell sections of jackets 42 and 43. Bell packer 131 is used to densify the concrete at the bell end of the packer to insure that all of the space in the bell end of the pipes are filled with concrete.

Figure 8:
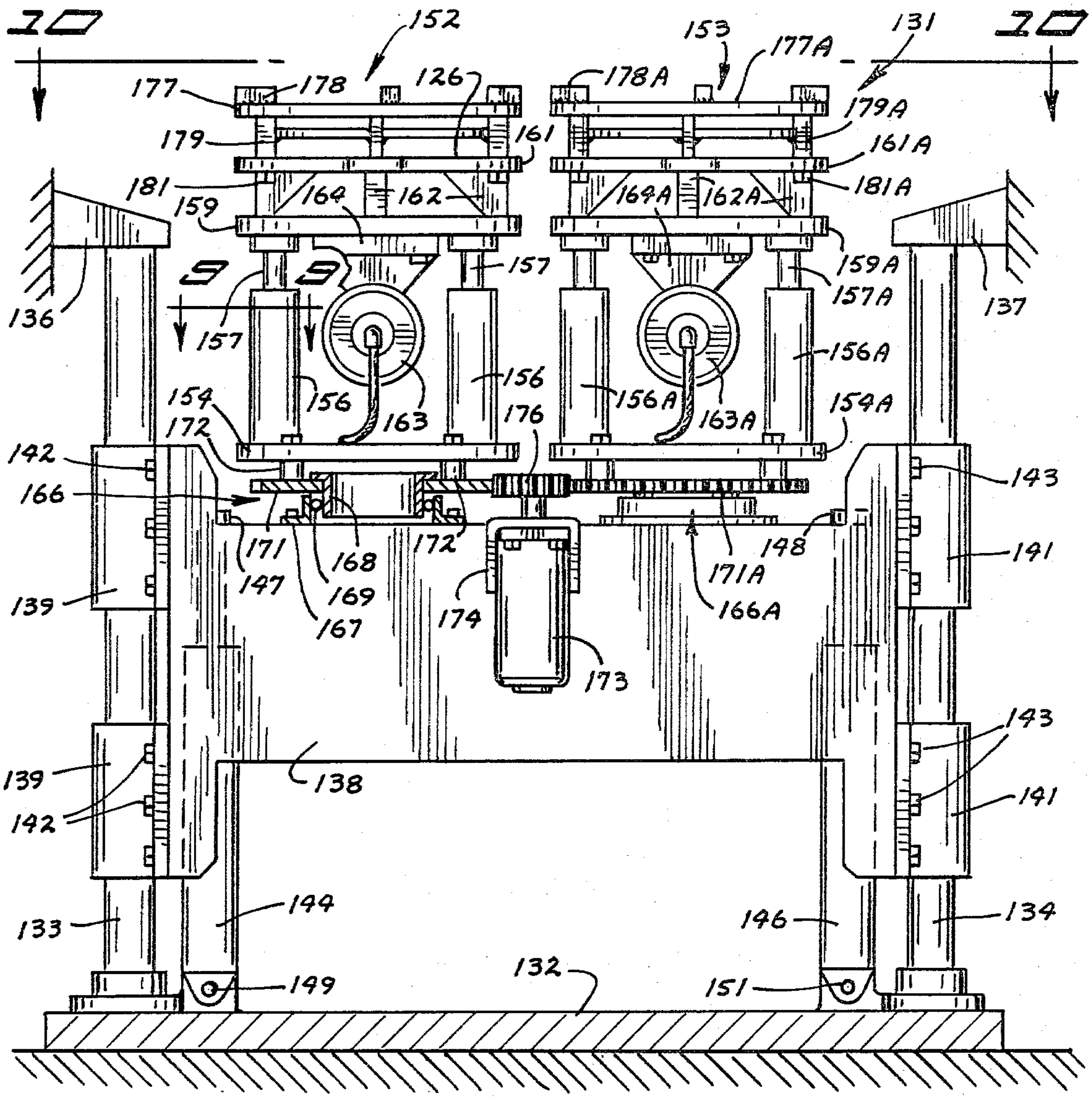
FIG. 8 is an enlarged front elevational view of the bell packer.

As shown in FIG. 8, bell packer 131 comprises a base 132 supported on the bottom of pit 38. A pair of upright posts 133 and 134 are attached to opposite ends of base 132. The upper ends of posts 133 and 134 are attached to inwardly directed brackets or supports 136 and 137 secured to the lower ends of frame posts 13 and 14, respectively. A movable carriage 138 extends horizontally between posts 133 and 134. A first pair of cylindrical members or sleeves 139 slidably mounted on post 133 are attached to one side of carriage 138. A second pair of cylindrical members or sleeves 141 attached to the opposite end of carriage 138 are slidably mounted on post 134. A plurality of fasteners 142 secures sleeves 139 to carriage 138. A plurality of fasteners 143 secure the sleeves 141 to the opposite side of carriage 138. Fasteners 142 and 143 can be nut-and-bolt assemblies. A pair of upright hydraulic cylinders 144 and 146 extended between base 132 and carriage 138 concurrently operate to selectively raise and lower carriage 138 along the linear extent of posts 133 and 134. The upper end of cylinder 144 engages a horizontal tab 147 secured to carriage 138. An inwardly directed tab 148 engages the upper end of cylinder 146. The lower ends of the cylinders are mounted on blocks or feet 149 and 151, respectively, attaching the cylinders 144 and 146 to base 132. Suitable hydraulic lines and valve controls within the access of the operator of the apparatus operatively connected to hydraulic cylinders 144 and 146 control the extension and contraction of the cylinders.

A pair of vibrating and turning units indicated generally at 152 and 153 are mounted on carriage 138. Unit 152 is in vertical alignment with the center longitudinal axis of jacket 42. Unit 152 is in vertical alignment with the center longitudinal axis of jacket 43. The following description is limited to the unit 152. The parts of unit 153 that correspond to the parts of unit 152 have the same reference numerals with the suffix A.

Figure 9:
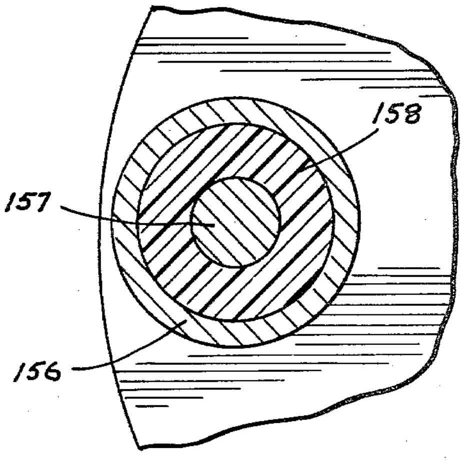
FIG. 9 is a sectional view taken along line 9—9 of FIG. 8.
Figure 13:
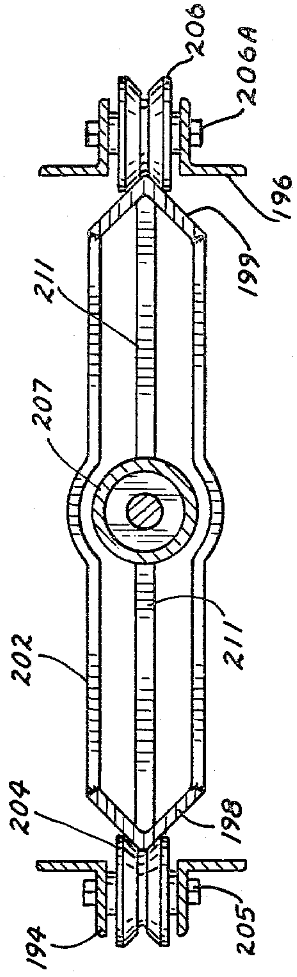
FIG. 13 is a sectional view taken along line 13—13 of FIG. 12.

Unit 152 has a horizontal base 154, as a flat disc, rotatably mounted for rotation about a vertical axis. Three upright tubular members 156 are secured to the top of base 154. Downwardly directed legs 157 extend into tubular members 156. As shown in FIG. 9, leg 157 is surrounded by an annular elastic cushioning member 158 to insulate carriage 138 from vibrations transmitted to legs 157. Member 158 is annular elastic rubber material.

Returning to FIG. 8, a circular horizontal table 159 is secured to the upper end of legs 157. Cross plates 161 are supported on the top of table 159 with a plurality of downwardly directed support members 162. Secured to the center of the bottom of table 159 is a vibrator 163. Vibrator 163 can be an electrically, hydraulically, or air operated vibrator operable to impart mechanical vibrations to table 159. A mount 164 connects vibrator 163 with the bottom of table 159.

Base 154 is rotatably supported on top of carriage 138 with a rotatable mount indicated generally at 166. As shown in FIG. 8, mount 166 has a fixed annular ring 167 secured to carriage 138. A rotatable ring 168 is concentrically positioned within ring 167 and rotatably mounted thereon with a plurality of rollers or balls 169. Ring 168 is secured to an annular spur gear 171. Upwardly directed spacers 172 secure gear 171 to the bottom of base 154. Base 154A is mounted on top of carriage 138 with a mount 166A similar to mount 166. A motor 173 mounted on carriage 138 with a generally U-shaped bracket 174 powers a drive gear 176 having external teeth in driving engagement with the teeth of the gears 171 and 171A. Motor 173 operates to concurrently rotate the gears 171 and 171A thereby rotating the vibrating and turning units 152 and 153.

A vibration ring 177 is mounted on the cross members of platform 161. Vibration ring 177 is an annular ring member having a plurality of upwardly directed pallet engaging members or ears 178 and downwardly directed support members 179. A plurality of bolts 181 secure support members 179 to cross members 161. Cross members 161 have a plurality of holes for accommodating vibration rings of different diameters.

Figure 11:
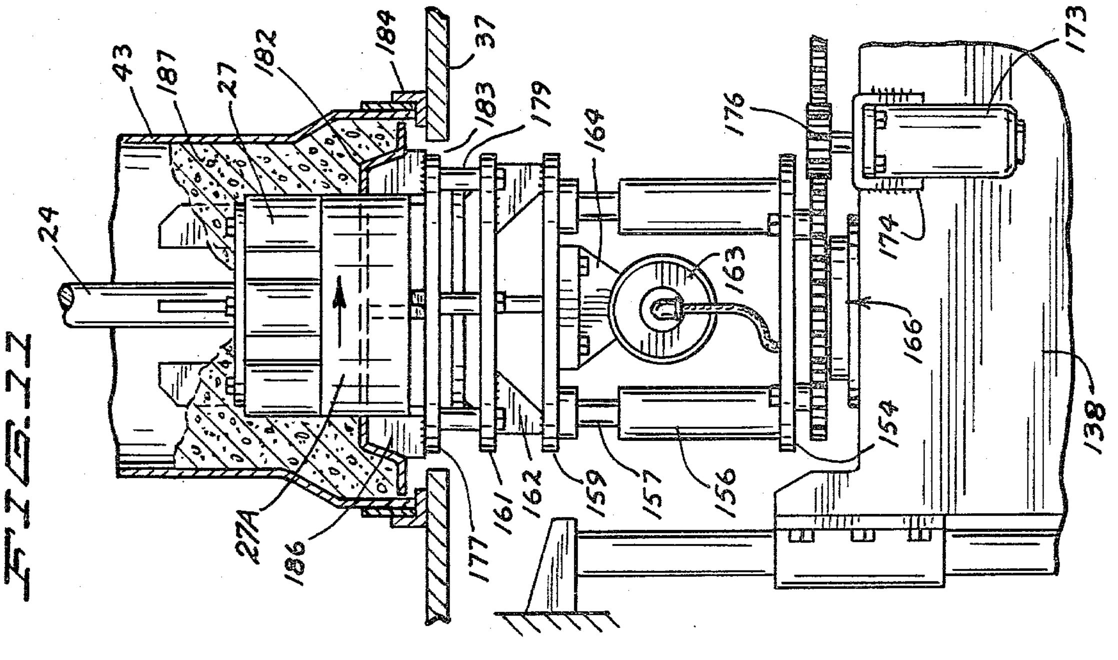
FIG. 11 is an enlarged front elevational view of one rotating and vibrating unit engageable with a pallet located in the bell section of a jacket.

Referring to FIG. 11, pallet 182 is located in the bell or lower end of jacket 43 above turntable 37. Pallet 182 is in concentric relation with hole 183 in turntable 37 and packer head 27. Packer head 27 has an annular skirt 27A that projects through the center hole in pallet 182 adjacent the vibration ring 177. A plurality of releasable latches 184 retain the pallet in assembled relation with jacket 43. Pallet 182 has a plurality of downwardly directed lugs 186 which are aligned with ears 178 on vibration ring 177. Rotating packer head 27 and rotating vibration ring 177 operate together to insure that concrete 187 is properly formed in the bell section of jacket 43.

Returning to FIG. 1, a pallet positioner indicated generally at 188 is located in pit 39 below turntable 34. Turntable 34 has two holes or openings 217 and 218 open to pit 34. Pallet positioner 188 functions to concentrically locate the pallets relative to the openings 217 and 218 and hold the pallets in an elevated position so that the jackets can be placed over the pallets and the pallets locked in the bell sections of the jackets.

Figure 12:
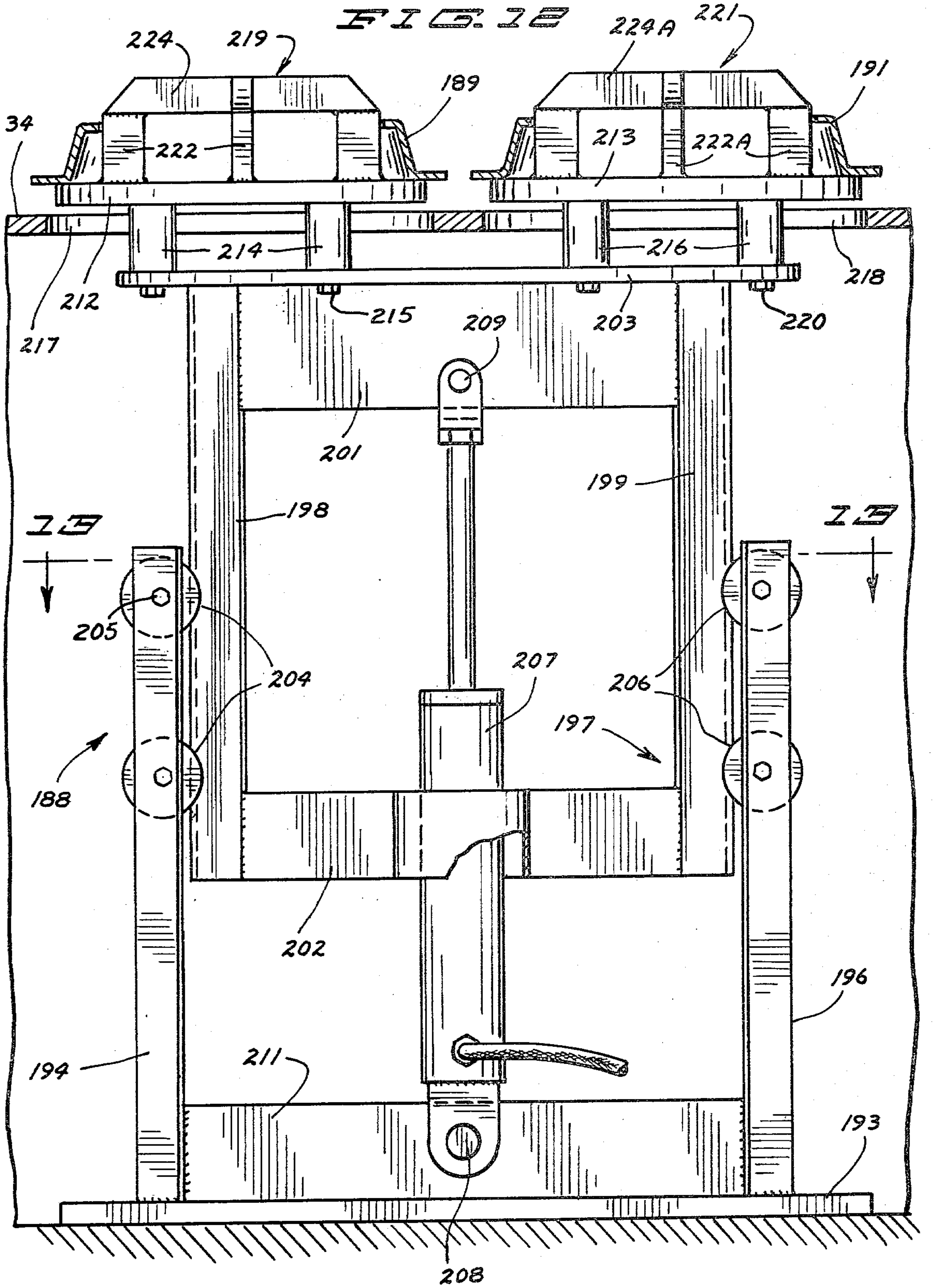
FIG. 12 is an enlarged front elevational view of the pallet positioner in its raised position.

As shown in FIG. 12, pallet positioner 188 is in a raised position and locates a pair of pallets 189 and 191 above turntable 34. Pallet positioner 188 has a horizontal base 193 carrying two upright side supports 194 and 196. An upwardly directed movable frame indicated generally at 197 is located between supports 194 and 196. Frame 197 has a pair of upwardly directed side angle members 198 and 199 connected to an upper cross plate 201. A pair of bottom cross members 201 are secured to the lower ends of angle members 198 and 199. A flat horizontal top plate 203 is secured to the top ends of angle members 198 and 199 and the top of cross plate 201. A first pair of rollers 204 is rotatably mounted on support 194 with balls 205. Rollers 204 have V grooves located in engagement with the apex section of angle member 198. The second pair of rollers 206 rotatably mounted on support 196 with balls 206A. Rollers 206 have V grooves located in engagement with an apex section of angle member 199. An upright hydraulic cylinder 207 is operable to selectively raise and lower frame 197. A lower pin 208 mounts the bottom of cylinder 207 to a lower cross plate 211 attached to base 193 and support members 194 and 196. An upper pin 209 connects the rod end of cylinder 207 to midportion of upper cross plate 201.

Figure 14:
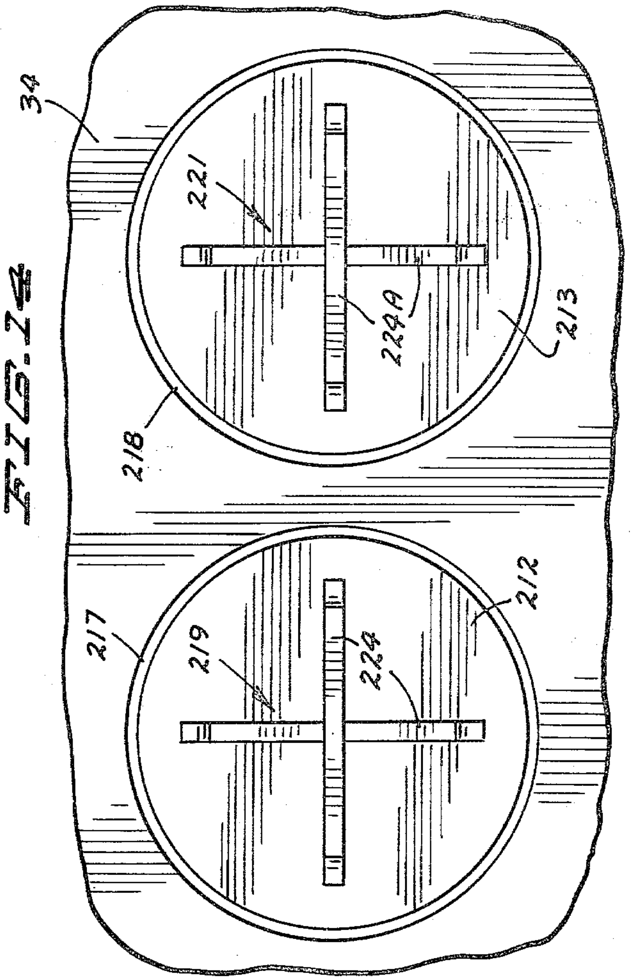
FIG. 14 is a top view of the pallet positioner viewing along line 14—14 of FIG. 1.

A pair of circular tables 212 and 213 are mounted on top of plate 203. As shown in FIG. 14, tables 212 and 213 have diameters smaller than openings 217 and 218, thereby allowing tables 212 and 213 to be located above the upper surface of turntable 34. Table 212 has a plurality of downwardly directed legs or spacers 214 secured to top plate 203 with bolts 215. A plurality of downwardly directed legs 216 mounts table 213 to top plate 203. Bolts 220 secure legs 216 to plate 203. A first guide and centering structure 219 is secured to the top of table 212. Guide and centering structure 219 has four upright members 222 connected to cross members 224. The outer end of cross members 224 are upwardly and inwardly inclined to provide sloping surfaces which permit the pallets to fit adjacent the outside edges of upright members 222. A second guide and centering structure 221 is secured to table 213. The structure of guide and centering structure 221 is identical with the structure of guide and centering structure 219. Like parts have the same reference numeral with the suffix A.

In use, pallet positioner 188 is moved to the raised position by actuating hydraulic cylinder 207. Tables 212 and 213 move through openings 217 and 218 and turntable 37. Pallets 189 and 191 are located about guide and centering structures 219 and 221 respectively. The lower outwardly directed flanges of the pallets are positioned above the top surface of turntable 34. A form assembly, as form assembly 41, is placed over the pallets and rests on the turntable 34. The latches on the bottom of the forms are placed in position whereby the pallets are locked into the bell sections of the jackets 41 and 42.

Turntable 34 is then rotated to locate form assembly 41 below top table 49 and above bell packer 131 as shown in FIG. 1. Cross head 18 is lowered to simultaneously lower top table 49 and packer heads 27 and 28. The top table 49 moves down until it engages the tops of jackets 42 and 43. At this time, the tongue formers or heads 82 and 83 are in position in the upper portions of jackets 42 and 43. The hydraulic cylinders 56 and 57 are actuated to firmly hold top table 49 in its operative down position in engagement with the upper ends of jackets 42 and 43. Cross head 18 continues to move down along the guides 19 and 21 until packer heads 27 and 28 are positioned in the bell sections of jackets 42 and 43. As shown in FIG. 11, the lower portions of skirts 24A of each packer head extends through the pallets.

The bell ends of the concrete pipes are formed by placing concrete 187 in the chambers of the pipes above packer heads 27 and 28. Conveyors 123 and 127 are operated to direct the concrete through open ends 62 and 63 of funnel 64 and 66 respectively. The bell packer 131 is raised into operative vibrating and rotating relationship with the pallets 182. Hydraulic cylinders 144 and 146 are extended to raise vibration rings 177 and 177A into engagement with lugs 186 of the pallets. The pallets 182 are raised a short distance so that they clear the latches 184 and are free to rotate relative to jackets 42 and 43.

The bell sections of the pipes are formed by rotating packer heads 27 and 28. This directs the concrete into the annular area above and around the pallets. The bell packer 131 is operated during the rotation of the packer heads. Motor 173 operates to drive the vibration rings 177 and 177A. With the ears 178 in driving engagement with lugs 186 secured to the pallets, the pallets are rotated. Vibrators 163 and 163A are operated to impart vibrations to vibrating rings 177 and 177A whereby pallets 182 and 182A are concurrently rotated and vibrated to form and finish the concrete pipe in the bell sections of the concrete pipes. After the bell sections of the pipes are formed, a bell packer is turned off and retracted to its lower position. Packer head 27 and 28 continue to rotate. The hydraulic cylinders 129 and 131 are actuated to raise cross head 18. This raises packer heads 27 and 28. Conveyors 123 and 127 continue to operate to discharge concrete into jackets 42 and 43. The operator of the machine can individually control the speed of operation of each conveyor, thereby insuring that a continuous supply of concrete is discharged into jackets 42 and 43.

The movement of the concrete into jackets 42 and 43 is facilitated by rotating funnels 64 and 66. Motors 101 and 101A are selectively operated by the operator of the machine to rotate funnels 64 and 66, respectively. The concrete on the inclined inner surfaces of the funnel is moved through the opening 62 and 63 by the stationary wiper blades 109, 112, 116, and 117.

Cross head 18 continues to be moved in an upward direction. When cross head 18 approaches its upper position it engages stop bolts 53A and 54A attached to lift rods 53 and 54. The upward movement of cross head 18 carries top table 49 in an upward direction thereby separating the top table 49 from the upper end of form assembly 41, as shown in FIG. 1. At this point, the packer heads 27 and 28 also move through openings 62 and 63 of top table 49.

Turntable 34 is then indexed to another position to move form assembly 41 along with the pipes formed therein to a position outside of frame 12. A new form assembly is simultaneously located in longitudinal alignment with table 49. The process of making a second pair of pipes is repeated. Form assembly 41 is transported with a transport vehicle or overhead crane to a stripping or curing area. Releasable latches 47 and the jackets 42 and 43 are disengaged, allowing the cylindrical wall 46 to expand. Form assembly 41 can then be stripped from the concrete pipes by movement in an upward direction. This is commonly achieved with an overhead crane or lifting apparatus. The pallets are left under the pipes until the concrete of the pipes is cured.

While there has been shown and described a preferred embodiment of the apparatus and method for simultaneously making two concrete pipes, it is understood that more than two concrete pipes can be made by adding additional jackets, packer heads, and bell packers to the machine. It is also understood that changes in the sizes, structure, and parts can be made by those skilled in the art without departing from the spirit and scope of the invention. The invention is defined in the following claims.

The embodiments of the invention in which an exclusive property or privilege is claimed are defined as follows:

1. A pallet positioner for locating pallets in selected positions on a turntable comprising: a movable frame, support means movably supporting the frame for movement between first and second positions, means connected to the frame operable to selectively move said frame to the first and second positions, a pair of tables mounted on the frame, and a pallet guide and positioning structure mounted on each table to locate a pallet on the turntable, said frame movable to the first position to locate the pallets in selected positions relative to the turntable.

2. The positioner of claim 1 wherein: the support means has a pair of upright supports, roller means mounting the frame on the supports, and said means connected to the frame comprising a hydraulic cylinder.

3. The positioner of claim 1 wherein: the pallet guide and positioning structure comprises a plurality of upright members and cross members attached to the upright members.

4. A pallet positioner for locating a plurality of pallets in selected positions on a pallet support comprising: a movable frame, support means movably supporting the frame for movement between first and second positions, means connected to the frame operable to selectively move said frame to the first and second positions, a plurality of tables mounted on the frame, and a pallet guide and positioning structure mounted on each table to locate a pallet on the pallet support, said frame movable to the first position to locate the pallets in selected positions relative to the pallet support.

5. The positioner of claim 4 wherein: the support means has a pair of upright supports, roller means mounting the frame on the supports, and said means connected to the frame comprising a hydraulic cylinder.

6. The positioner of claim 4 wherein: the pallet guide and positioning structure comprises a plurality of upright members and cross members attached to the upright members.

7. The positioner of claim 4 wherein: the means connected to the frame operable to selectively move said frame to the first and second positions comprises a hydraulic cylinder.

8. The positioner of claim 4 wherein: a pair of tables are mounted on the frame.

9. The positioner of claim 4 wherein: the pallet support has a plurality of holes for accommodating the tables mounted on the frame, said pallet guide and positioning structure mounted on each table being adapted to pass through the holes in the pallet support when the frame has been moved to the first position.

10. The positioner of claim 4 wherein: the support means has a pair of upright supports, and roller means mounting the frame on the supports.

11. A pallet positioner for locating pallets in selected positions on a pallet support comprising: a movable frame, support means movably mounting the frame for movement between first and second positions, means connected to the frame operable to selectively move said frame to the first and second positions, and pallet guide and positioning means operatively associated with the frame and movable therewith to locate the pallets relative to the pallet support when the frame has been moved to the first position.

12. The positioner of claim 11 wherein: the support means has a pair of upright supports, and roller means mounting the frame on the supports.

13. The positioner of claim 11 wherein: the means connected to the frame includes a hydraulic cylinder.

14. The positioner of claim 11 including: table means connecting the pallet guide and positioning means to the frame.

15. The positioner of claim 14 wherein: the table means comprises a pair of tables, said pallet guide and positioning means including a first guide and positioning structure mounted on one table and a second guide and positioning structure mounted on the other table.

16. The positioner of claim 14 wherein: each pallet guide and positioning structure has a plurality of upright members and a plurality of cross members attached to the upright members.

17. The positioner of claim 11 wherein: the pallet support has a plurality of holes for accommodating the pallet guide and positioning means, said pallet guide and positioning means being adapted to pass through the holes in the pallet support when the frame has been moved to the first position.

* * * * *

UNITED STATES PATENT AND TRADEMARK OFFICE

CERTIFICATE OF CORRECTION

PATENT NO. : 4,226,568

DATED : October 7, 1980

INVENTOR(S) : Alfred W. Christian

It is certified that error appears in the above-identified patent and that said Letters Patent are hereby corrected as shown below:

Column 6, line 47, "152" should be --153--.

Signed and Sealed this

*Thirtieth* Day of *December 1980*

[SEAL]

*Attest:*

SIDNEY A. DIAMOND

*Attesting Officer* *Commissioner of Patents and Trademarks*